(12) United States Patent
Rutzen

(10) Patent No.: US 7,755,842 B2
(45) Date of Patent: Jul. 13, 2010

(54) ANASTIGMATIC ANAMORPHIC LENS SYSTEM

(75) Inventor: Frank Rutzen, Magdeburg (DE)

(73) Assignee: Ruped Systems GmbH, Barleben (DE)

( * ) Notice: Subject to any disclaimer, the term of this patent is extended or adjusted under 35 U.S.C. 154(b) by 0 days.

(21) Appl. No.: 12/449,201

(22) PCT Filed: Jan. 29, 2008

(86) PCT No.: PCT/DE2008/000154

§ 371 (c)(1),
(2), (4) Date: Aug. 5, 2009

(87) PCT Pub. No.: WO2008/092431

PCT Pub. Date: Aug. 7, 2008

(65) Prior Publication Data

US 2010/0014168 A1   Jan. 21, 2010

(30) Foreign Application Priority Data

Jan. 29, 2007   (DE) ........................ 10 2007 005 168

(51) Int. Cl.
G02B 13/08   (2006.01)
(52) U.S. Cl. ........................... 359/668; 359/671
(58) Field of Classification Search ................. 359/668, 359/671
See application file for complete search history.

(56) References Cited

U.S. PATENT DOCUMENTS

| 2,731,883 | A | * | 1/1956 | Kohler et al ................. 359/671 |
| 3,871,748 | A | | 3/1975 | Day |
| 5,671,093 | A | | 9/1997 | Jung et al. |
| 5,731,908 | A | | 3/1998 | Kim |
| 6,310,731 | B1 | | 10/2001 | Wartmann et al. |
| 6,512,636 | B2 | | 1/2003 | Schauss |
| 6,995,920 | B2 | | 2/2006 | Nurishi |
| 2004/0196570 | A1 | | 10/2004 | Nurishi |

FOREIGN PATENT DOCUMENTS

| DE | 23 47 737 | 4/1974 |
| DE | 41 04 684 | 6/1992 |
| DE | 196 50 724 | 6/1997 |
| DE | 199 11 862 | 3/2001 |
| DE | 100 60 072 | 6/2002 |

* cited by examiner

OTHER PUBLICATIONS

IPER, PCT/DE2008/000154, Oct. 13, 2009. (Not included, since it was cited by Applicant -without a PTO-1449- and provided in the image file).*

*Primary Examiner*—Scott J Sugarman
(74) *Attorney, Agent, or Firm*—Jordan and Hamburg LLP

(57) ABSTRACT

Disclosed is an anastigmatic anamorphic lens unit for processing images, particularly multidimensional images, as they are generated and evaluated, for example in connection with spatially resolved spectroscopy. The lens unit has a high anamorphic factor and comprises several lens subassemblies, a positive refractive subassembly (a) comprising at least one rotationally symmetrical lens or lens group being disposed on the lens side in order to reduce the field angle. A central optical subassembly (b) is disposed behind the positive refractive subassembly (a) in the beam path for beam divergence in one or more directions perpendicular to the optical axis, while maintaining small field angles, wherein the central optical subassembly (b) comprises at least one anamorphically distorting element and one or more rotationally symmetrical lenses or lens groups. An additional optical subassembly (c) for narrowing and enlarging the aperture on the axes in which the beam is diverged is disposed on the image side, wherein this optical subassembly (c) located on the image side alternately comprises at least one anamorphically distorting element and at least one rotationally symmetrical lens.

11 Claims, 3 Drawing Sheets

ANASTIGMATIC ANAMORPHIC LENS SYSTEM

BACKGROUND OF THE INVENTION

The invention relates to an anastigmatic anamorphic lens unit for processing images, particularly multidimensional images, as they are generated and evaluated, for example in connection with spatially resolved spectroscopy.

Using an anamorphic lens, spatially resolved spectral images can be depicted on sensor arrays using different lateral image scales.

An anamorphic lens system or "anamorphot" produces a "distorted image" by way of different image scales in two orthogonal directions. The ratio of these two image scales is referred to as the compression ratio, aspect ratio, anamorphic ratio, or anamorphic lens factor.

Anamorphic lens systems are used in image processing, primarily for taking and projecting motion pictures and static pictures. These applications are directed at taking into consideration the psychological visual perception of the person, and/or an effectively utilizing the footage and/or digital data media.

The design of an anamorphic lens is generally based on a previously corrected rotationally symmetrical base lens unit, which is combined with one or two more lens units, each comprising uniformly oriented cylindrical lenses.

A compact two-piece anamorphic lens for the digital projection of electronically produced images is known, for example (DE 10060072). The basic arrangement comprises a front anamorphic lens unit having two cylindrical subcomponents with high refractive power in the horizontal direction and a spherical projection lens unit at the center, and a rear anamorphic lens having one or more cylindrical lenses with low refractive power in the vertical direction and a negative focal length.

A further three-piece arrangement, for example for taking pictures with a process camera, is known from the printing industry (U.S. Pat. No. 3,871,748), wherein two afocal cylindrical lens systems are disposed, in front of and behind a rotationally symmetrical lens unit. In the literature, further combinations of spherical and cylindrical lens units are described, wherein the cylindrical and rotationally symmetrical spherical units are corrected independently of each other.

One patent (DE 199 11 862 C1) differs from this design principle, and particularly from an automatically corrected base lens unit. Here, "conventional" cylindrical lens systems are combined with special spherical base lens units, which still have aberrations, which have not been corrected, and which, together with the aberrations of the cylindrical lens units, improve the quality of the image.

Furthermore, an anamorphic attachment for recording and reproduction purposes has been described (DE 41 04 684 C1), which comprises a lens group encompassing both spherical and cylindrical surfaces.

Furthermore, an anamorphic converter is known, which is suitable for converting a digital 16:9 (1.78:1) film format to the conventional 2.35:1 format using a compression or aspect ratio of 1.252:0.947 (anamorphic factor 1.322), while largely avoiding the formation of ellipses (U.S. Pat. No. 6,995,920 B2).

All of these examples and principles have in common that the individual sub-systems are initially configured independently of each other, and that compression or aspect ratios (anamorphic factors) of 1.3:1 (1.3) to 2:1 (2) are substantially not exceeded, or that, during conversion, aspect ratios in the opposite direction of 1:1.3 (0.77) to 1:2 (0.5) are substantially met. While correction of aberrations and astigmatism is desired, it is possible only with limitations, due to the respectively separate observation of individual systems. Requirements for the imaging behavior of the anamorphic lens in conjunction with a well-corrected image, which are collectively extremely high, and which arise, for example, in spatially resolved spectroscopy, mean that the procedure that was common when designing such systems, and which corresponds to the prior art, can no longer be followed. FIG. 5 illustrates the principle of spatially resolved spectroscopy, which is known per se. Here, photographs of planar elements located in an object region (on the outside left in FIG. 5) typically must be reproduced in two-dimensional spectral images such that one direction constitutes the spatial resolution and, orthogonal thereto, the second direction constitutes the spectral resolution (on the outside right in FIG. 5). Processing of the image, which is advantageous for a faster evaluation, is carried out with a dispersive lens unit, which is disposed between the plane elements and a sensor array illustrated as a lattice, and comprises the anamorphic lens.

Depending on the lens unit producing the spectral image, both directions may have markedly different image scales, which must be represented for any further evaluation, such as on the sensor array having a fixed geometry. The different image scales of the spectral image and the representation of such multidimensional spectral images on sensor arrays that differ markedly in terms of the two dimensions of width and height, result in great difficulties when designing the correspondingly required anamorphic lens.

SUMMARY OF THE INVENTION

In contrast with this, the anastigmatic anamorphic lens unit according to the invention has the advantage of being configured in accordance with the exacting demands of spatially resolved spectroscopy.

As differs from the conventional design objectives for anamorphic lenses heretofore known from the prior art, the following primary advantages according to the invention are achieved with respect to the imaging properties:

1. Compression or aspect ratios (anamorphic factors) of up to 8:1
2. An aperture on the image side in the compressed direction of >0.8
3. Telecentricity on the lens side at both azimuths (x/z and y/z plane FIG. 3)
4. Achromatism of the anamorphic lens across a large wavelength range (in the visible and/or infrared regions)
5. Astigmatism by way of planar surfaces in the image region
6. Long focal intercept with respect to the aperture
7. Well-corrected spherical aberrations and astigmatism
8. Finite image scales in both azimuths The optical components denoted in the text below as "distorting optical elements" and illustrated in FIG. 3 of the embodiment are typically also referred to as cylindrical lenses, and the optically effective surfaces A1 and A2 thereof are referred to as cylindrical surfaces. Hereinafter, surfaces that have an aspherical curve in a plane (here in the y/z plane) and, as with cylindrical lenses, have a curvature of zero in a plane orthogonal thereto, which is also indicated by B2 according to FIG. 4 of the embodiment, are referred to as aspherical cylindrical surfaces, and optical elements according to FIG. 4 of the embodiment having at least one such surface B2 are referred to as aspherical cylindrical lenses.

When reference is made hereinafter to a toric surface as a distorting element, it means that the refractive power of the optical element varies with the azimuth about the optical axis. The meaning of the term is not limited to the usual implementation with different curvature radii in orthogonal directions perpendicular to the optical axis (such as the cylindrical lens), but also includes the use of aspherical formulas for calculating the surface points.

The design of the anastigmatic anamorphic lens unit according to the invention can be described as follows:

It comprises a three-piece arrangement, and initially only the optical elements having rotational symmetry will be discussed. In the first approach, the anamorphically distorting elements are considered at the positions according to the invention as plane-parallel surfaces that encompass materials having high refractive power. Based on this, to begin with, a largely rotationally symmetrical base system is designed.

For the initial design, the apertures on the lens side and on the image side as well as the focal lengths and focal intercepts are to be selected such that the desired image scale can theoretically be implemented, particularly in the distorting plane, and subsequently good correction of the astigmatism between the two azimuths becomes possible.

To begin with, the positive refractive spherical subassembly on the lens side, which serves to reduce the field angles/apertures, can be designed relatively easily.

Thereafter, the central optical subassembly is designed so that sufficient divergence of the beam cone in the direction of the greatest compression, and therefore the largest aperture on the image side, can subsequently be implemented using distorting elements, while keeping the field angles/apertures in the compression direction small. The spherical subassembly on the lens side and the central optical subassembly are then corrected without distortion with respect to chromatic aberrations.

Furthermore, an arrangement according to the invention is selected for the optical subassembly on the image side, the previously defined focal lengths and focal intercepts are implemented for the entire system without distortion, and the entire rotationally symmetrical base system is corrected with respect to spherical and chromatic aberrations.

It is only then that the anamorphically distorting elements, which are usually cylindrical lenses, are integrated into the rotationally symmetrical base system that has now be created, at the sites of the plane-parallel surfaces, and the radii thereof are defined in connection with the total correction of the system. In order to increase the design freedom, according to the invention, aspherical cylindrical lenses or other elements having toric surfaces may be used.

Finally, the entire system is corrected with respect to the aberrations thereof, and in particular with respect to astigmatism.

According to an advantageous embodiment, the at least one anamorphically distorting element of the central subassembly is negative refractive in at least one direction, and at least one triplet of rotationally symmetrical lenses is disposed behind the at least one anamorphical distorting element, within the central subassembly. In this way, sufficient beam divergence in at least one direction is achieved, while maintaining small field angles, which later allows sufficient compression of the image with sufficient correction of the astigmatism.

According to an advantageous embodiment of the invention in this respect, the triplet is disposed approximately at the center of the overall system. Due to this arrangement of the triplet, and due to its rotational symmetry at both azimuths, the optimization possibilities for chromatic aberrations and spherical aberrations are improved.

According to a further advantageous embodiment of the invention, the anamorphically distorting elements are made of materials having high refractive power n, where n>1.7. In this way, in connection with the arrangement of the distorting elements, beam divergence and compression, which are sufficiently large to implement large apertures on the image side, are achieved.

According to a different advantageous embodiment of the invention, at least one of the anamorphically distorting elements of the central optical subassembly and of the optical subassembly on the image side comprises at least one cylindrical lens, the two toric surfaces of which are disposed in orthogonal directions perpendicular to the optical axis (z) and are calculated according to Equation 1

$$z = \frac{C * y^2}{1 + \sqrt{(1 - C^2 y^2)}} \quad \text{Eq. 1}$$

where
C=curvature
y=surface coordinate
z=coordinate in the direction of the optical axis.

The use of cylindrical lenses configured in this way is advantageous in that these elements can be produced relatively easily and cost-effectively.

According to a different advantageous embodiment of the invention, at least one of the anamorphically distorting elements in the central optical subassembly and in the optical subassembly on the image side comprises at least one aspherical cylindrical lens, which is to say at least one of the two toric surfaces is disposed in the orthogonal directions (x, y) perpendicular to the optical axis (z) and is calculated based on surface formulas for aspheres. The use of cylindrical lenses configured in this way allows high apertures to be achieved on the image side, with excellent possibilities for correction of aberrations and astigmatism.

According to an advantageous embodiment of the invention in this respect, the at least one toric surface is calculated based on the surface formula $$z = \frac{C * y^2}{1 + \sqrt{(1 - (K+1)C^2 y^2)}} + A_1^* y^4 + A_2^* y^6 + \quad \text{Eq. 2}$$
$$A_3^* y^8 + A_4^* y^{10} + A_5^* y^{12} + A_6^* y^{14} + A_7^* y^{16} + A_8^* y^{18}$$

where
C=curvature
y=surface coordinate
z=coordinate in the direction of the optical axis
$A_n$=aspherical coefficient
K=conic constant The use of elements having such surfaces allows high apertures to be achieved on the image side, with excellent possibilities for correction of aberrations and astigmatism. Furthermore, these surfaces having a curvature of 0 in the x-direction (aspherical cylindrical lenses) are also easy to manufacture.

According to a different advantageous embodiment of the invention, at least one of the rotationally symmetrical lenses in the optical subassemblies is aspherical. This has the advantage that, within the basic arrangement according to the invention, improved possibilities for correction the aberrations and astigmatism are obtained, even with rotationally symmetrical aspheres.

According to a further advantageous embodiment of the invention, all distorting elements comprise aspherical cylindrical lenses. In this way, the degree of freedom of arrangement for implementing a very high anamorphic factor is considerably increased, with excellent correction of the aberrations and astigmatism.

According to a different advantageous embodiment of the invention, the positive refractive subassembly comprises two positive spherical lenses, the central optical subassembly comprises a negative refractive aspherical cylindrical lens in one direction and a positive spherical triplet, and the optical subassembly on the image side comprises two positive spherical lenses, an aspherical cylindrical lens, two positive spherical lenses, and an aspherical cylindrical lens, in this sequence. This combination has the advantage that, in this way, the design objectives according to the invention can be achieved with a very compact arrangement.

A specific anastigmatic anamorphic lens unit according to the invention has the following parameters:

One embodiment of the invention is illustrated in the drawings and described in more detail below.

DESCRIPTION OF THE PREFERRED EMBODIMENTS

Tables 1 and 2 give design values and refractive indexes for a selected configuration of an anastigmatic anamorphic lens unit according to the invention.

| Surface no. | Radii | Distances | Refractive indexes | Notes |
|---|---|---|---|---|
| 1 | −333.30 | 2.75 | 1.595 | |
| 2 | −37.82 | 1.00 | Air | |
| 3 | 58.15 | 2.46 | 1.755 | |
| 4 | 132.20 | 8.06 | Air | |
| 5 | 0.00 | 1.50 | 1.850 | * cylindrical surface |
| 6 | 25.48 | 23.31 | Air | ** aspherical cylindrical surface |
| 7 | 23.50 | 6.75 | 1.595 | |
| 8 | −27.48 | 0.00 | Air | |
| 9 | −27.48 | 1.40 | 1.850 | |
| 10 | 22.45 | 4.23 | Air | |
| 11 | 34.80 | 6.50 | 1.595 | |
| 12 | −32.70 | 42.14 | Air | |
| 13 | 18.79 | 5.50 | 1.595 | |
| 14 | 15.28 | 2.12 | Air | |
| 15 | 23.75 | 5.64 | 1.850 | |
| 16 | 48.24 | 1.00 | Air | |
| 17 | 20.77 | 3.80 | 1.850 | ** aspherical cylindrical surface |
| 18 | 61.70 | 1.20 | Air | * cylindrical surface |
| 19 | 27.46 | 1.50 | 1.850 | |
| 20 | 15.50 | 0.00 | Air | |
| 21 | 15.50 | 2.50 | 1.595 | |
| 22 | 100.00 | 0.35 | Air | ** aspherical cylindrical surface |
| 23 | 7.06 | 3.00 | 1.850 | * cylindrical surface |
| 24 | 27.21 | | | |

| Surface No. | K | A1 | A2 | A3 | A4 | A5 | A6 | A7 | A8 |
|---|---|---|---|---|---|---|---|---|---|
| 6 | 1.94E+00 | 3.00E−05 | −7.40E−07 | −2.24E−07 | 5.45E−09 | 0.00E+00 | 0.00E+00 | 0.00E+00 | 0.00E+00 |
| 17 | 7.93E−01 | 6.13E−05 | −3.03E−06 | −4.47E−08 | 6.03E−10 | 0.00E+00 | 0.00E+00 | 0.00E+00 | 0.00E+00 |
| 23 | −2.57E−01 | −1.12E−03 | 1.05E−04 | −2.26E−06 | 2.06E−08 | 0.00E+00 | 0.00E+00 | 0.00E+00 | 0.00E+00 |

Here, it has been shown that a compression ratio (anamorphic factor) of 8.25:1 (8.25) can be achieved for an aperture on the image side in the compressed direction of >0.84. This allows for telecentricity on the lens side at both azimuths, and the anamorphic lens is largely achromatic in a long wavelength range in the infrared region. It was possible to correct the astigmatism by way of a planar surface in the image region and a long focal intercept with respect to the aperture. The spherical aberrations and astigmatism are well corrected for finite image scales at both azimuths.

Further advantages and advantageous embodiments of the invention are apparent from the following description of the embodiment, drawings, and claims.

Figure 1:
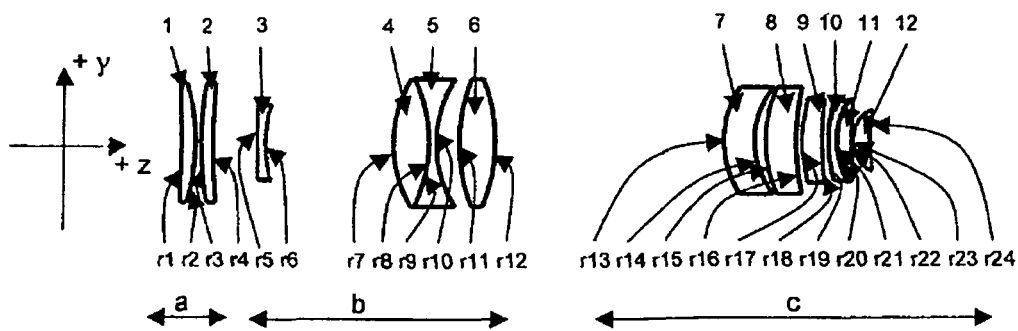
FIG. 1 shows a possible arrangement of optical elements for implementing the anastigmatic anamorphic lens unit according to the invention.
Figure 2:
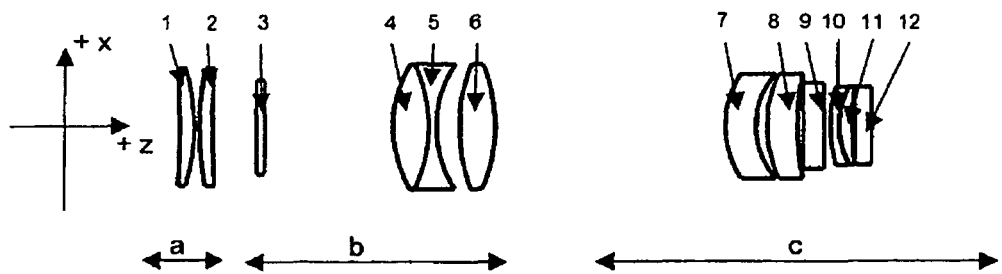
FIG. 2 is a view of this lens unit from a viewing direction that is positioned at 90° with respect to the view from FIG. 1.

As is apparent from FIGS. 1 and 2, in the present example, the anastigmatic anamorphic lens unit according to the invention comprises three lens subassemblies, which is to say an optical subassembly a on the lens side, a central optical subassembly b, and an optical subassembly c on the image side. The optical subassembly a on the lens side is formed by exclusively rotationally symmetrical lenses 1 and 2, having the radii $r_1$ and $r_2$, or $r_3$ and $r_4$ listed in Table 1. Accordingly, it is a spherical subassembly having a positive refractive effect. It is used to reduce the field angles.

The optical elements used to implement the distortion act at the azimuth on the short side (y/z plane) with respect to the primary imaging properties thereof. At the azimuth on the long side (x/z plane), they predominantly act on the astigmatism.

Figure 3:
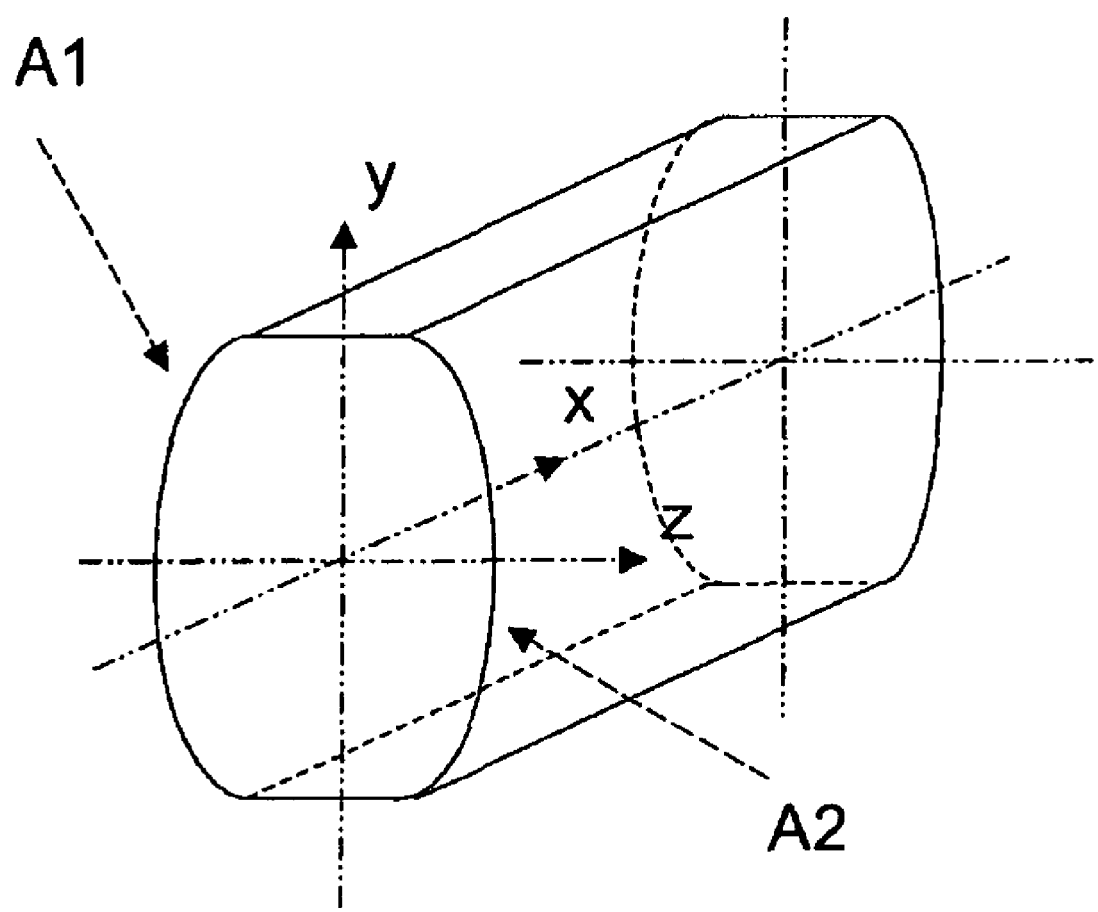
FIG. 3 shows a cylindrical lens having cylindrical surfaces.
Figure 4:
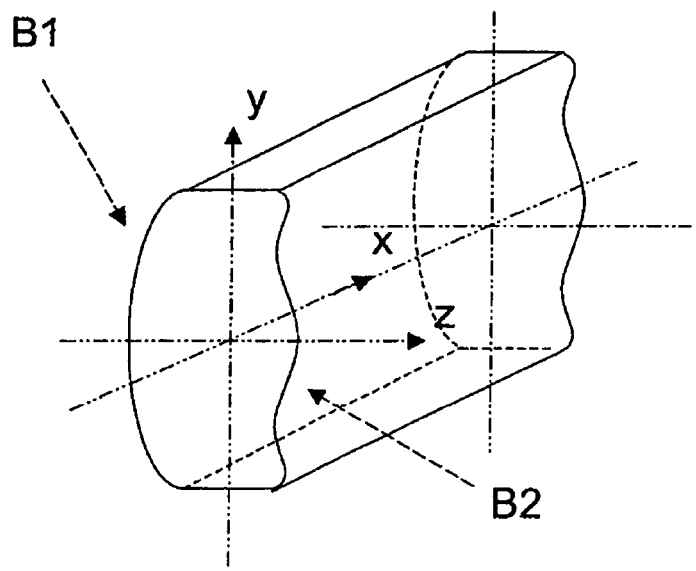
FIG. 4 shows a cylindrical lens having aspherical surfaces.
Figure 5:
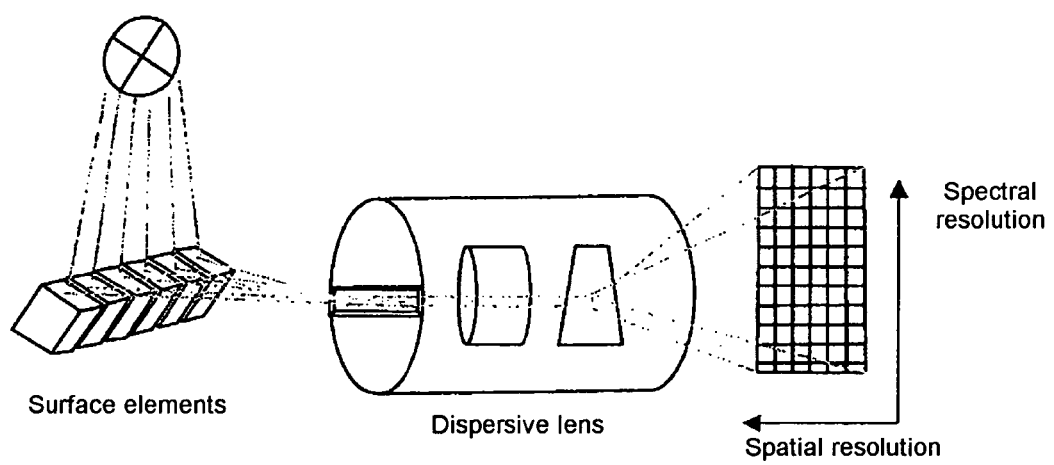
FIG. 5 shows a schematic view of spatially resolved spectroscopy showing the state of the art.

Typically, cylindrical lenses according to FIG. 3 having optically effective cylindrical surfaces A1 and A2 are used as distorting optical elements. Conversely, in the present example, optical elements according to FIG. 4 are used, which are so-called aspherical cylindrical lenses, having at least one aspherical surface B2.

An anamorphically distorting element (3) is disposed in the central optical subassembly b, this element operating diffusively and, in conjunction with a triplet comprising rotationally symmetrical lenses 4, 5, and 6, bringing about beam divergence in the compression direction. Due to the rotational symmetry thereof at both azimuths, and due to the arrangement at the center of the lens unit, the triplet improves the optimization possibilities with respect to chromatic aberrations and spherical aberrations.

Two anamorphically distorting optical elements 9 and 12 are alternately disposed with positive spherical lenses 7, 8 and 10, 11 in the optical subassembly c on the image side. A high aperture of at least 0.8 is thereby achieved at the azimuth of the short side (y/z plane).

Highly refractive glass is used for the anamorphically distorting elements 3, 9, and 12. The associated high dispersion and the effect thereof on the chromatic aberrations are compensated for by means of the lenses combined therewith by way of appropriately selected refractive powers, distances, and glasses.

Usually cylindrical lenses that correspond to the state of the art, such as shown in FIG. 3, are used as anamorphically distorting optical elements. They include cylindrical surfaces A1 and A2 as optically effective surfaces.

As is apparent from FIG. 4, in the present example the cylindrical surfaces are replaced by a toric surface B1 or B2 for each anamorphically distorting element 3, 9, 12. Toric surfaces are aspherical surfaces without rotational symmetry about the axis orthogonal to the section. The primary imaging properties of the anamorphically distorting elements 3, 9, 12 are effected therewith. This can be a less curved surface, but a surface having greater curvature is preferred. In order to maintain the symmetry in the main sections, which are disposed overlaid orthogonally, the respective element axes y and z intersect the optical axis of the system indicated by x.

All characteristics provided in the description, the following claims, and the drawings may be essential to the invention, both individually or in any arbitrary combination with each other.

LIST OF REFERENCE NUMERALS

A1 cylindrical surface
A2 cylindrical surface
B1 toric surface
B2 toric surface
a optical subassembly on the lens side
b central optical subassembly
c optical subassembly on the image side
$r_n$ lens radii
x x-axis
y y-axis
z z-axis
1, 2 rotationally symmetrical lens
3 anamorphically distorting element
4, 5, 6 rotationally symmetrical lens
7, 8 positive spherical lens
9 anamorphically distorting element
10, 11 positive spherical lens
12 anamorphically distorting element
In Equations 1 and 2 the following meanings apply:
z coordinate in the direction of the optical axis
C curvature
y surface coordinate
$A_n$ aspherical coefficient
K conical constant

The invention claimed is:

1. An anastigmatic anamorphic lens unit for processing images, particularly multidimensional images, in spatially resolved spectroscopy,
   having a high anamorphic factor, which is an anamorphic factor greater than 3.0,
   comprising several lens subassemblies,
   wherein a positive refractive subassembly (a), comprising at least one rotationally symmetrical lens or lens group, is disposed on the lens side in order to reduce the field angles,
   a central optical subassembly (b) being disposed behind the positive refractive subassembly (a) in the beam path for beam divergence in one or more direction perpendicular to the optical axis, while maintaining small field angles,
   wherein the central optical subassembly (b) comprises at least one anamorphically distorting element and one or more rotationally symmetrical lens or lens groups, and
   an additional optical subassembly (c) being disposed on the image side for narrowing and for enlarging the aperture on the axis in which the beam is diverged,
   wherein the optical subassembly (c) on the image side alternately comprises at least one anamorphically distorting element and at least one rotationally symmetrical lens or lens group.

2. The anastigmatic anamorphic lens unit according to claim 1, wherein at least one anamorphically distorting element of the central optical subassembly (b) is negative refractive in at least one direction, and at least one triplet of rotationally symmetrical lenses is disposed after the at least one anamorphically distorting element within the central subassembly (b).

3. The anastigmatic anamorphic lens unit according to claim 2, wherein the triplet is disposed approximately at the center of the lens unit.

4. The anastigmatic anamorphic lens unit according to claims 1 or 2, wherein the anamorphically distorting elements comprise materials having a high refractive power n, which is to say n>1.7.

5. An anastigmatic anamorphic lens unit according to any one of claims 1 to 3, wherein at least one of the anamorphically distorting elements of the central optical subassembly (b) and of the optical subassembly (c) on the image side comprises at least one cylindrical lens, the two toric surfaces (A1, A2) of which are disposed in orthogonal directions (x, y) perpendicular to the optical axis (z) and are calculated according to Equation 1

$$z = \frac{C*y^2}{1+\sqrt{(1-C^2 y^2)}} \qquad \text{Eq. 1}$$

where
C=curvature
y=surface coordinate
z=coordinate in the direction of the optical axis.

6. An anastigmatic anamorphic lens unit according to any one of claims 1 to 3, wherein at least one of the anamorphically distorting elements of the central optical subassembly (b) and of the optical subassembly (c) on the image side comprises at least one aspherical cylindrical lens, which is to say at least one of the two toric surfaces (B1, B2) is disposed in orthogonal directions (x, y) perpendicular to the optical axis (z) and is calculated according to surface formulas for aspheres.

7. The anastigmatic anamorphic lens unit according to claim 6, wherein the calculation of the at least one toric surface (B1, B2) is carried out according to the surface formula $$z = \frac{C*y^2}{1+\sqrt{(1-(K+1)C^2y^2)}} + A_1^*y^4 + A_2^*y^6 + A_3^*y^8 + A_4^*y^{10} + A_5^*y^{12} + A_6^*y^{14} + A_7^*y^{16} + A_8^*y^{18}$$ Eq. 2 where
C=curvature
y=surface coordinate
z=coordinate in the direction of the optical axis
$A_n$=aspherical coefficient
K=conic constant.

8. An anastigmatic anamorphic lens unit according to any one of claims 1 to 3, wherein at least one of the rotationally symmetrical lenses in the optical subassemblies (a, b, c) is aspherical.

9. An anastigmatic anamorphic lens unit according to any one of claims 1 to 3, wherein all the distorting elements are aspherical cylindrical lenses.

10. An anastigmatic anamorphic lens unit according to any one of claims 1 to 3, wherein the positive refractive subassembly (a) comprises two positive spherical lenses, the central optical subassembly (b) comprises a negative refractive aspherical cylindrical lens in one direction and a positive spherical triplet, and the optical subassembly (c) on the image side comprises two positive spherical lenses, an aspherical cylindrical lens, two positive spherical lenses, and an aspherical cylindrical lens, in this sequence.

11. An anastigmatic anamorphic lens unit according to any one of claims 1 to 3, wherein the lens unit has the following parameters:

| Surface no. | Radii | Distances | Refractive indexes | Notes |
|---|---|---|---|---|
| 1 | −333.30 | 2.75 | 1.595 | |
| 2 | −37.82 | 1.00 | Air | |
| 3 | 58.15 | 2.46 | 1.755 | |
| 4 | 132.20 | 8.06 | Air | |
| 5 | 0.00 | 1.50 | 1.850 | * cylindrical surface |
| 6 | 25.48 | 23.31 | Air | ** aspherical cylindrical surface |
| 7 | 23.50 | 6.75 | 1.595 | |
| 8 | −27.48 | 0.00 | Air | |
| 9 | −27.48 | 1.40 | 1.850 | |
| 10 | 22.45 | 4.23 | Air | |
| 11 | 34.80 | 6.50 | 1.595 | |
| 12 | −32.70 | 42.14 | Air | |
| 13 | 18.79 | 5.50 | 1.595 | |
| 14 | 15.28 | 2.12 | Air | |
| 15 | 23.75 | 5.64 | 1.850 | |
| 16 | 48.24 | 1.00 | Air | |
| 17 | 20.77 | 3.80 | 1.850 | ** aspherical cylindrical surface |
| 18 | 61.70 | 1.20 | Air | * cylindrical surface |
| 19 | 27.46 | 1.50 | 1.850 | |
| 20 | 15.50 | 0.00 | Air | |
| 21 | 15.50 | 2.50 | 1.595 | |
| 22 | 100.00 | 0.35 | Air | ** aspherical cylindrical surface |
| 23 | 7.06 | 3.00 | 1.850 | * cylindrical surface |
| 24 | 27.21 | | | |

| Surface No. | K | A1 | A2 | A3 | A4 | A5 | A6 | A7 | A8 |
|---|---|---|---|---|---|---|---|---|---|
| 6 | 1.94E+00 | 3.00E−05 | −7.40E−07 | −2.24E−07 | 5.45E−09 | 0.00E+00 | 0.00E+00 | 0.00E+00 | 0.00E+00 |
| 17 | 7.93E−01 | 6.13E−05 | −3.06E−06 | −4.47E−08 | 6.03E−10 | 0.00E+00 | 0.00E+00 | 0.00E+00 | 0.00E+00 |
| 23 | −2.57E−01 | −1.12E0.3 | 1.05E−04 | −2.26E−06 | 2.06E−08 | 0.00E+00 | 0.00E+00 | 0.00E+00 | 0.00E+00. |

* * * * *